United States Patent
Yang

(10) Patent No.: US 9,477,288 B2
(45) Date of Patent: Oct. 25, 2016

(54) UNIVERSAL SERIAL BUS HOST AND POWER MANAGEMENT METHOD THEREOF

(75) Inventor: Seung-Soo Yang, Hwaseong-si (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 570 days.

(21) Appl. No.: 13/611,347

(22) Filed: Sep. 12, 2012

(65) Prior Publication Data
US 2013/0166928 A1 Jun. 27, 2013

(30) Foreign Application Priority Data
Dec. 26, 2011 (KR) ........................ 10-2011-0141916

(51) Int. Cl.
*G06F 1/26* (2006.01)
*G06F 1/32* (2006.01)

(52) U.S. Cl.
CPC ............. *G06F 1/3212* (2013.01); *G06F 1/266* (2013.01); *Y02B 60/1292* (2013.01)

(58) Field of Classification Search
CPC .................. G06F 1/3212; G06F 1/266; H02J 2007/0062; H02J 7/0075
USPC .................................................. 713/300, 320
See application file for complete search history.

(56) References Cited

U.S. PATENT DOCUMENTS

| | | | |
|---|---|---|---|
| 7,489,974 B2 | 2/2009 | Numano | |
| 8,219,729 B1 * | 7/2012 | Wright ................ | G06F 13/4022 710/104 |
| 2004/0042138 A1 * | 3/2004 | Saito et al. ...................... | 361/90 |
| 2005/0057223 A1 * | 3/2005 | Harada .......................... | 320/128 |
| 2006/0035527 A1 * | 2/2006 | Numano ........................ | 439/668 |
| 2006/0125446 A1 * | 6/2006 | Tupman et al. ............... | 320/132 |
| 2007/0236975 A1 * | 10/2007 | Lippojoki et al. .............. | 363/66 |
| 2007/0254727 A1 * | 11/2007 | Sewall et al. .................. | 455/574 |
| 2008/0242369 A1 * | 10/2008 | Kazuta et al. ................. | 455/573 |
| 2009/0063877 A1 * | 3/2009 | Lewis et al. ................... | 713/310 |
| 2009/0077277 A1 * | 3/2009 | Vidal et al. ...................... | 710/46 |
| 2010/0090644 A1 | 4/2010 | Nokkonen et al. | |
| 2010/0153594 A1 * | 6/2010 | Nakayama ........................ | 710/63 |
| 2011/0101913 A1 * | 5/2011 | Matsumoto et al. .......... | 320/107 |
| 2012/0313571 A1 * | 12/2012 | Knowlton ...................... | 320/107 |

FOREIGN PATENT DOCUMENTS

| | | |
|---|---|---|
| JP | 2005275611 | 10/2005 |
| JP | 4075513 | 4/2008 |

* cited by examiner

*Primary Examiner* — Kim Huynh
*Assistant Examiner* — Brandon Kinsey
(74) *Attorney, Agent, or Firm* — F. Chau & Associates, LLC

(57) ABSTRACT

A universal serial bus (USB) host includes a power unit and a USB interface unit. The power unit includes a battery and a charging module configured to control the battery. The USB interface unit is configured to interface with a first USB device, and is configured to be controlled based on a remaining amount of power of the battery. The USB interface unit is further configured to maintain a data connection between the USB interface unit and the first USB device when a power supply connection between the USB interface unit and the first USB device is disconnected.

20 Claims, 19 Drawing Sheets

FIG. 5

| bmRequestType | bRequest | wValue | wIndex | wLength | Data |
|---|---|---|---|---|---|
| 10000000B | GET_CONFIGURATION | Zero | Zero | One | Configuration Value |

FIG. 6

| Offset | Field | Size | Value | Description |
|---|---|---|---|---|
| 7 | bmAttributes | 1 | Bitmap | Configuration characteristics<br><br>D7: Reserved (set to one)<br>D6: Self-powered<br>D5: Remote Wakeup<br>D4...0: Reserved (reset to zero) |

FIG. 7

| bmRequestType | bRequest | wValue | wIndex | wLength | Data |
|---|---|---|---|---|---|
| 10000000B<br>10000001B<br>10000010B | GET_STATUS | Zero | Zero<br>Interface<br>Endpoint | Two | Device,<br>Interface, or<br>Endpoint<br>Status |

FIG. 8

| D7 | D6 | D5 | D4 | D3 | D2 | D1 | D0 |
|----|----|----|----|----|----|----|----|
| Reserved (Reset to zero) | | | | | | Remote Wakeup | Self Powered |
| D15 | D14 | D13 | D12 | D11 | D10 | D9 | D8 |
| Reserved (Reset to zero) | | | | | | | |

FIG. 9

| Mode | | Self-Powered | | | Bus-Powered | | |
|---|---|---|---|---|---|---|---|
| | | Host | | Device | Host | | Device |
| | | V bus | D +/− | State | V bus | D +/− | State |
| Normal | | On | On | Configured | On | On | Configured |
| Power Saving | L1 | Off | On | Configured | On | On | Configured |
| | L2 | Off | On | Configured | Off | Off | Attached |
| | L3 | Off | Off | Powered | Off | Off | Attached |

FIG. 11

| Mode | | Self-Powered | | | Bus-Powered | | |
|---|---|---|---|---|---|---|---|
| | | Host | | Device | Host | | Device |
| | | V bus | D +/− | State | V bus | D +/− | State |
| Normal | | On | On | Configured | On | On | Configured |
| Power Charging | L1 | Charging input | On | Configured | On | On | Configured |
| | L2 | Charging input | On | Configured | Off | Off | Attached |
| | L3 | Charging input | Off | Powered | Off | Off | Attached |

UNIVERSAL SERIAL BUS HOST AND POWER MANAGEMENT METHOD THEREOF

CROSS-REFERENCE TO RELATED APPLICATIONS

This application claims priority under 35 U.S.C. §119 to Korean Patent Application No. 10-2011-0141916, filed on Dec. 26, 2011, the disclosure of which is incorporated by reference herein in its entirety.

TECHNICAL FIELD

Exemplary embodiments of the inventive concept relate to a universal serial bus (USB) host and a USB power management system including the same, and more particularly, to a USB host that controls a power supply connection and a data communication connection based on the characteristics of connected USB devices, a USB power management system including the same, and a power management method using the same.

DISCUSSION OF THE RELATED ART

USB is a standard used for connecting a host device such as a personal computer (PC) and an external device. A USB host may include a power supply source. For example, the USB host may include a power adapter supplying primary power, and a battery supplying auxiliary power. The USB host may detect which power supply source is currently supplying power, and may control the power supply for driving the system.

USB devices may be self-powered devices including a battery, or bus-powered devices that receive power from a USB host through a USB connection.

Although self-powered USB devices can normally operate without receiving power from the connected USB host since they have their own power supply, self-powered USB devices may still draw power from the USB host, which may accelerate the power consumption of the USB host. Further, when the USB host disconnects the power supply connection with a USB device to save power, the data communication connection between the USB host and the USB device is also interrupted.

SUMMARY

According to an exemplary embodiment of the inventive concept, a universal serial bus (USB) host includes a power unit comprising a battery and a charging module configured to control the battery, and a USB interface unit configured to interface with at least one first self-powered USB device. The USB interface unit may be controlled based on a remaining amount of power of the battery and maintain a data connection between the USB interface unit and the first USB device when a power supply connection between the USB interface unit and the first USB device is disconnected.

The USB interface unit may interface with at least one second bus-powered USB device. When the USB host is set to a power saving mode according to the remaining power or the input signal, the USB interface unit may connect the data communication line to the second USB device depending on the connection of the power supply line between the power unit and the second USB device.

According to an exemplary embodiment of the inventive concept, a USB host includes a power unit including a battery and a charging module configured to control the battery, and a USB interface unit configured to have a power supply line and a data communication line and to interface with at least one first self-powered USB device. The USB interface unit may be controlled based on the remaining power of the battery or a user's input signal to be supplied with power from the first USB device.

The USB interface unit may maintain connection of the data communication line with the first USB device separately from the power supply from the first USB device.

The USB interface unit may include a USB port configured to interface with the first or second USB device through the power supply line and the data communication line, and a host driver configured to be connected with the charging module. The host driver may determine whether a USB device is interfaced, and identify the type of USB device that has been interfaced. The host driver may switch connection of the data communication line and the power supply line to the USB port according to the type of the connected USB device, the remaining power of the battery, or the user's input signal.

The host driver may include a switcher configured to switch the connection of the data communication line and the power supply line to the USB port. The host driver may generally control the USB interface unit, determine whether a USB device is interfaced, identify the type of USB device that has been interfaced, and control the power supply line and the data communication line connected to the USB device according to the type of the USB device, the remaining power of the battery, or the user's input signal.

The host driver may control the switcher to reverse an input/output path of the power supply line to the first USB device to allow the first USB device to charge the USB host, and may control the switcher to turn off (e.g., deactivate) the data communication line between the USB host and the first USB device.

The host driver may control the switcher to turn off the power supply line to the second USB device and turn off (e.g., deactivate) the data communication line between the USB host and the second USB device according to the power supply line that has been turned off.

A USB host includes a power unit and a USB interface. The power unit includes a battery and a charging module configured to control the battery. The USB interface unit is configured to interface with a first USB device. The USB interface unit is configured to be controlled based on a remaining amount of power of the battery, and the USB interface unit is configured to separately control a data connection between the USB interface and the first USB device, and a power supply connection between the USB interface unit and the first USB device.

A USB host includes a power unit and a USB interface. The power unit includes a battery and a charging module configured to control the battery. The USB interface unit is configured to interface with at least one of a self-powered USB device or a bus-powered USB device. The USB interface unit is configured to be controlled based on a remaining amount of power of the battery, and the USB interface unit is configured to separately control a power supply line connected to the USB interface and at least one of the self-powered and bus-powered USB devices, and a data communication line connected to the USB interface and at least one of the self-powered and bus-powered USB devices.

A universal serial bus (USB) power management method includes connecting a USB device to a USB host, wherein the USB host comprises a battery, determining a remaining amount of power of the battery, setting an operation mode of the USB host to a normal mode upon determining that the remaining amount of power is greater than a first power threshold, setting the operation mode of the USB host to a power saving mode upon determining that the remaining amount of power is less than or equal to the first power threshold and greater than a second power threshold, and setting the operation mode of the USB host to a power charging mode upon determining that the remaining amount of power is less than the second power threshold. The USB host communicates data with the USB device and supplies power to the USB device while in the normal mode, communicates data with the USB device and does not supply power to the USB device while in the power saving mode, and communicates data with the USB device and receives power from the USB device while in the power charging mode.

BRIEF DESCRIPTION OF THE DRAWINGS

The above and other features of the inventive concept will become more apparent by describing in detail exemplary embodiments thereof with reference to the accompanying drawings, in which:

FIG. 5 shows an example of a request that a USB host transmits to a USB device, according to an exemplary embodiment of the inventive concept;

FIG. 6 shows an example of a response that the USB device transmits to the USB host in response to the request of the USB host illustrated in FIG. 5, according to an exemplary embodiment of the inventive concept;

FIG. 7 shows an example of a request that the USB host transmits to the USB device, according to an exemplary embodiment of the inventive concept;

FIG. 8 shows an example of a response that the USB device transmits to the USB host in response to the request of the USB host illustrated in FIG. 7, according to an exemplary embodiment of the inventive concept;

FIG. 9 is a table showing the power and data connection states when the USB host illustrated in FIGS. 1 and 2 is set to a power saving mode, according to an exemplary embodiment of the inventive concept;

FIG. 11 is a table showing the power and data connection states when the USB host illustrated in FIGS. 1 and 2 is set to a power charging mode, according to an exemplary embodiment of the inventive concept;

DETAILED DESCRIPTION OF THE EXEMPLARY EMBODIMENTS

Figure 1:
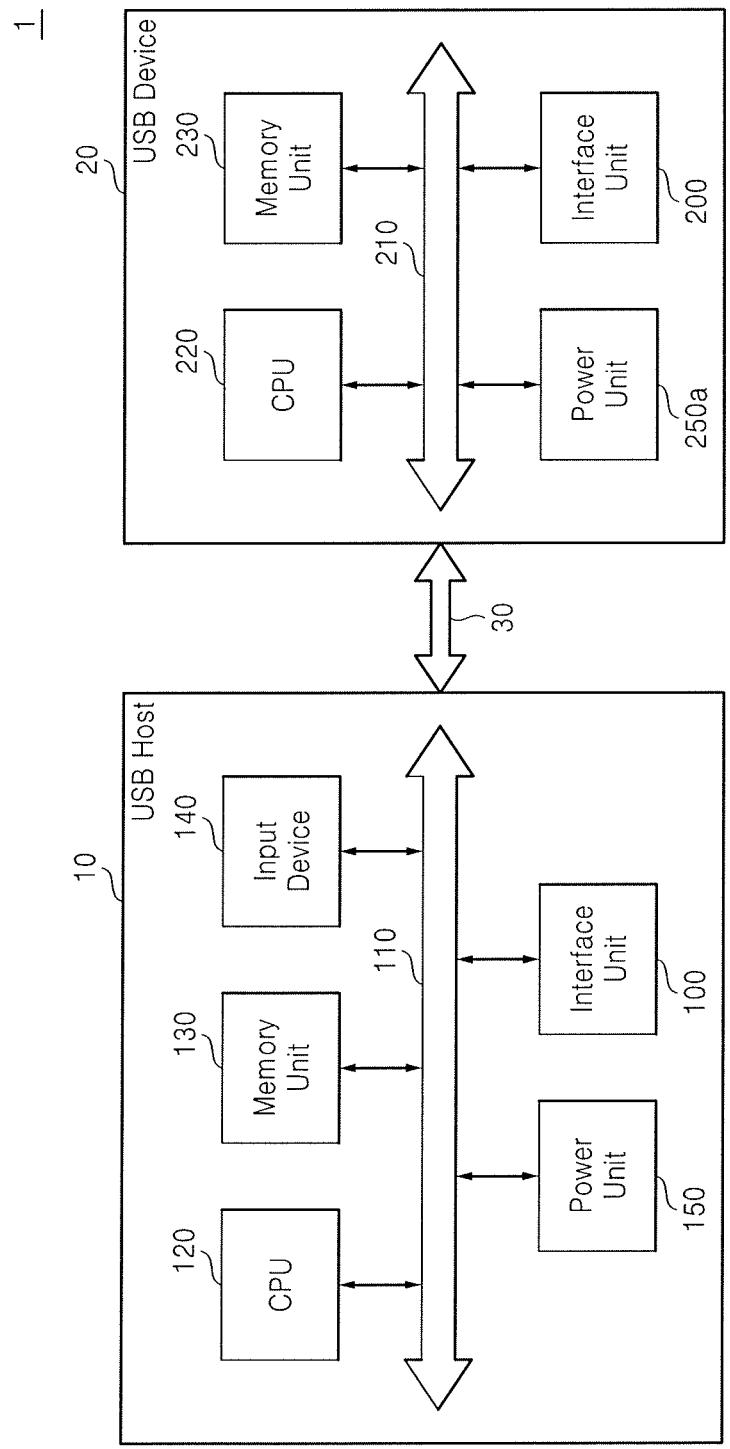
FIG. 1 is a schematic block diagram of a universal serial bus (USB) power management system, according to an exemplary embodiment of the inventive concept.

Exemplary embodiments of the inventive concept will be described more fully hereinafter with reference to the accompanying drawings. Like reference numerals may refer to like elements throughout the accompanying drawings.

It will be understood that when an element is referred to as being "connected" or "coupled" to another element, it can be directly connected or coupled to the other element or intervening elements may be present.

It will be understood that, although the terms first, second, etc. may be used herein to describe various elements, these elements should not be limited by these terms. These terms are used to distinguish one element from another. For example, a first signal could be termed a second signal, and, similarly, a second signal could be termed a first signal without departing from the teachings of the disclosure.

As used herein, the singular forms "a", "an" and "the" are intended to include the plural forms as well, unless the context clearly indicates otherwise. It will be further understood that the terms "comprises" and/or "comprising," or "includes" and/or "including" when used in this disclosure, specify the presence of stated features, regions, integers, steps, operations, elements, and/or components, but do not preclude the presence or addition of one or more other features, regions, integers, steps, operations, elements, components, and/or groups thereof.

Figure 2:
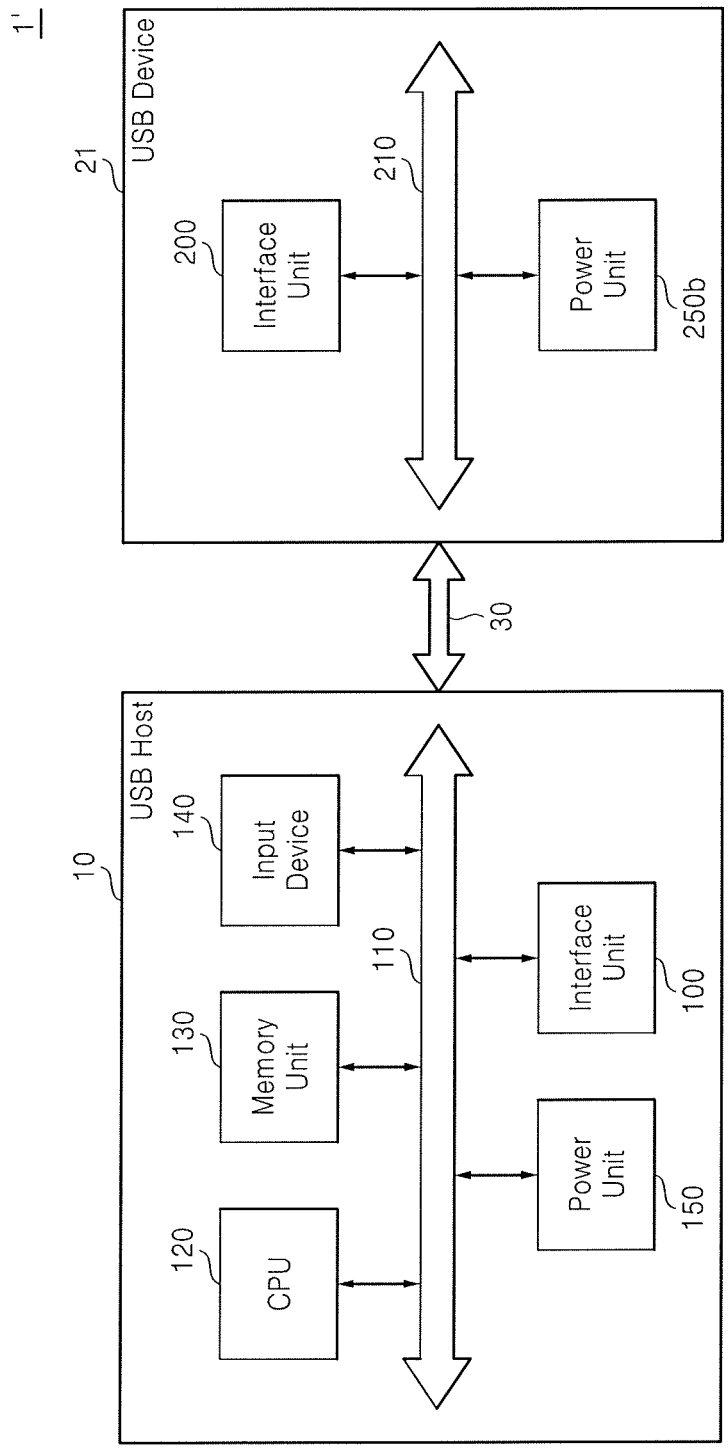
FIG. 2 is a schematic block diagram of a USB power management system, according to an exemplary embodiment of the inventive concept.

FIG. 1 is a schematic block diagram of a universal serial bus (USB) power management system 1, according to an exemplary embodiment of the inventive concept. FIG. 2 is a schematic block diagram of a USB power management system 1', according to an exemplary embodiment of the inventive concept.

Referring to FIG. 1, the USB power management system 1 includes a USB host 10, a self-powered USB device 20, and a USB cable 30.

The USB host 10 and the self-powered USB device 20 are connected to each other through the USB cable 30. The USB cable 30 includes a power supply line (terminals Vbus and GND) and a data communication line (terminals D+ and D−) through which a set of signals is transmitted. The USB host 10 and the self-powered USB device 20 may communicate with each other through the USB cable 30 using a data transmission protocol.

The USB host 10 may be implemented as, for example, a portable device such as a tablet personal computer (PC) or a smart phone, however the USB host 10 is not limited thereto. The self-powered USB device 20 may be implemented as, for example, a smart phone, a tablet PC, a portable USB charger, a portable USB handwarmer, a portable USB fan, a portable USB MP3 player, a personal digital assistant (PDA), a navigator, a USB hub, or an external USB hard disk, however the self-powered USB device 20 is not limited thereto.

The USB host 10 may include an interface unit 100, a bus 110, a central processing unit (CPU) 120, a memory unit 130, an input device 140, and a power unit 150.

The interface unit 100 may include various types of interfaces such as, for example, a USB interface, a high definition multimedia interface (HDMI), a local area network (LAN) interface, a parallel port interface, and a serial port interface. For clarity of the description, the interface unit 100 is described hereinafter as including the USB interface, however exemplary embodiments of the inventive concept are not limited thereto.

The USB interface unit 100 includes the power supply line (Vbus, GND) and the data communication line (D+, D−). The USB interface unit 100 is configured to interface with at least one first self-powered USB device, or at least one second bus-powered USB device. When the USB host 10 is set to a power saving mode, the USB interface unit 100 manages the data communication line connected to USB devices separately from the power supply line connected between the power unit 150 and the USB devices, thereby maintaining data communication in the event of a power loss. The USB host 10 may be set to a power saving mode automatically based on power remaining in its battery, or manually in response to input received from a user. When the USB host 10 is set to a power charging mode, the USB interface unit 100 manages the data communication with a connected USB device, and the USB interface unit 100 may receive power from a connected self-powered USB device.

The CPU 120 controls the overall operation of the USB host 10. The memory unit 130 stores parameters and data that are used for the operation of the USB host 10. The input device 140 is a device such as, for example, a touch sensor, a button sensor, a motion sensor, a speech recognition module, a temperature sensor, or a camera sensor, which receives an input from a user and converts the input into an electrical signal.

The power unit 150 manages the power supply of the USB host 10.

The interface unit 100, CPU 120, memory unit 130, input device 140, and power unit 150 are connected through the bus 110. The structure of the USB host 10 is not limited to the exemplary embodiments described with reference to FIG. 1. For example, in exemplary embodiments, the USB host 10 may also include other intellectual property (IP) blocks and/or a display device.

The self-powered USB device 20 may include an interface unit 200, a bus 210, a CPU 220, a memory unit 230, and a power unit 250a.

The interface unit 200 may further include various types of interfaces such as, for example, a USB interface, an HDMI interface, a LAN interface, a parallel port interface, and a serial port interface. For clarity of the description, the interface unit 200 is described hereinafter as including the USB interface, however exemplary embodiments of the inventive concept are not limited thereto.

The CPU 220 controls the overall operation of the self-powered USB device 20. The memory unit 230 stores parameters and data that are used for the operation of the self-powered USB device 20. The power unit 250a manages the power supply of the self-powered USB device 20 and may include a battery, as described in further detail below.

The interface unit 200, CPU 220, memory unit 230, and power unit 250a are connected through the bus 210. The structure of the self-powered USB device 20 is not limited to the exemplary embodiments described with reference to FIG. 1. For example, in exemplary embodiments, the self-powered USB device 20 may also include other IP blocks and/or a display device.

Referring to FIG. 2, the USB power management system 1' includes the USB host 10 and a bus-powered USB device 21. The USB power management system 1' includes certain similar structures as those described with reference to the USB power management system 1 illustrated in FIG. 1. Description of these similar structures may be omitted when referring to FIG. 2, and the differences between the USB power management system 1 of FIG. 1 and the USB power management system 1' of FIG. 2 will be primarily described.

In an exemplary embodiment, the bus-powered USB device 21 may include a memory unit and/or a CPU.

Unlike the self-powered USB device 20 illustrated in FIG. 1, the bus-powered USB device 21 includes a power unit 250b that does not have a battery. As a result, the bus-powered USB device 21 is only capable of operating when it is connected to and receiving power from the USB host 10.

Figure 3:
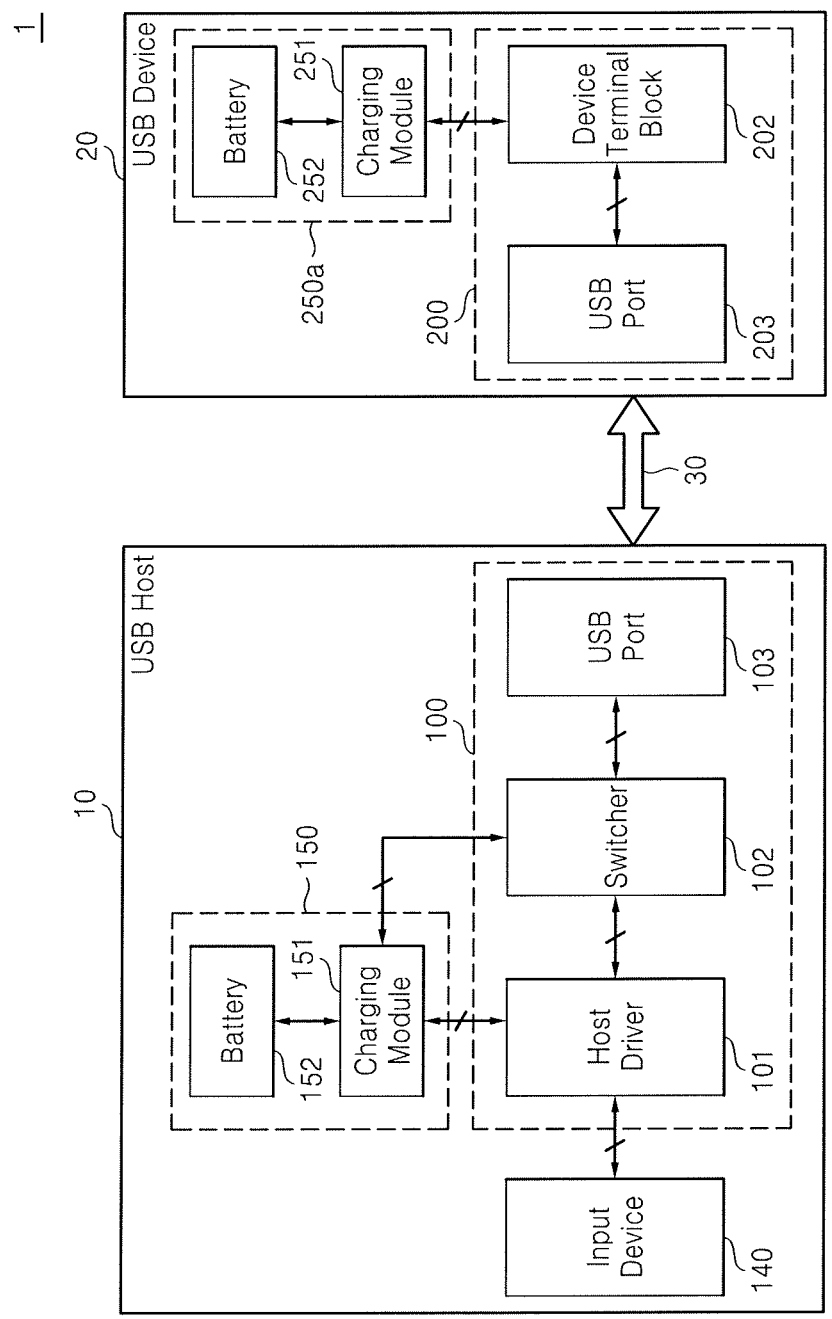
FIG. 3 is a block diagram showing the interface units illustrated in FIG. 1, according to an exemplary embodiment of the inventive concept.

FIG. 3 is a block diagram showing the interface units 100 and 200 illustrated in FIG. 1, according to an exemplary embodiment of the inventive concept. Referring to FIG. 3, the USB host 10 is connected with the self-powered USB device 20 as described with reference to FIG. 1.

The interface unit 100 of the USB host 10 may include a host driver 101, a switcher 102, and a USB port 103. The interface unit 200 of the USB device 20 may include a device terminal block 202 and a USB port 203.

The USB ports 103 and 203 include the power supply line (terminals Vbus and GND) and the data communication line (terminals D+ and D−). The USB ports 103 and 203 interface with the USB host 10 and the USB device 20, and the USB host 10 and the USB device 20 communicate with each other using the same data transmission protocol.

The power unit 150 of the USB host 10 may include a battery 152 and a charging module 151. The battery 152 can be charged and discharged. The charging module 151 controls the power supply used for the charging and discharging operations of the battery 152, and the operation of each element of the USB host 10.

The power unit 250a of the self-powered USB device 20 may include a battery 252 and a charging module 251. The battery 252 can be charged and discharged by the charging module 251. For example, the charging module 251 controls power supply necessary for the charging and discharging operations of the battery 252, and the operation of each element of the self-powered USB device 20. The self-powered USB device 20 receives power from the battery 252 included therein. As a result, the self-powered USB device 20 can operate when it is not connected to and receiving power from the USB host 10 or from another power source (e.g., a travel adapter).

The switcher 102 sets a current path for the USB port 103 by switching the connection between the data communication line and the power supply line. The switcher 102 switches the power supply line (Vbus, GND) to control power supply/charge, and independently switches the data communication line to control the connection/disconnection of data communication.

The device terminal block 202 switches the data communication connection and the power supply connection with the USB port 203. For example, the device terminal block 202 switches the power supply line (Vbus, GND) to control the power supply between the USB host 10 and the USB device 20, and independently switches the data communication line to control the connection/disconnection of data communication.

The host driver 101 is connected between the switcher 102 and the charging module 151, and is utilized to determine whether the USB host 10 is interfaced with the interface unit 100, and the type of the USB device that has been interfaced (e.g., the type of USB device may be self-powered or bus-powered). The host driver 101 controls the switcher 102 based on the type of the USB device, the remaining power of the battery 152, or an input signal received from a user.

The host driver 101 may set the mode of the USB host 10 based on an input signal input by a user through the input device 140. The USB host 10 may include a normal mode, a power saving mode, or a power charging mode.

The input device 140 may be, for example, a touch sensor, a button sensor, a motion sensor, a speech recognition module, a temperature sensor, or a camera sensor, which receives an input from a user and converts the input into an electrical signal. The user's input may be at least one of a touch input, a button input, a speech input, a motion sensing input, a temperature input, a camera input, and a gesture input, however the type of input is not limited thereto.

The host driver 101 transmits a request to the USB device connected to the USB port 103, and detects the characteristics of the USB device. The detection of the characteristics of the USB device will be described further with reference to FIGS. 5 through 8.

Figure 4:
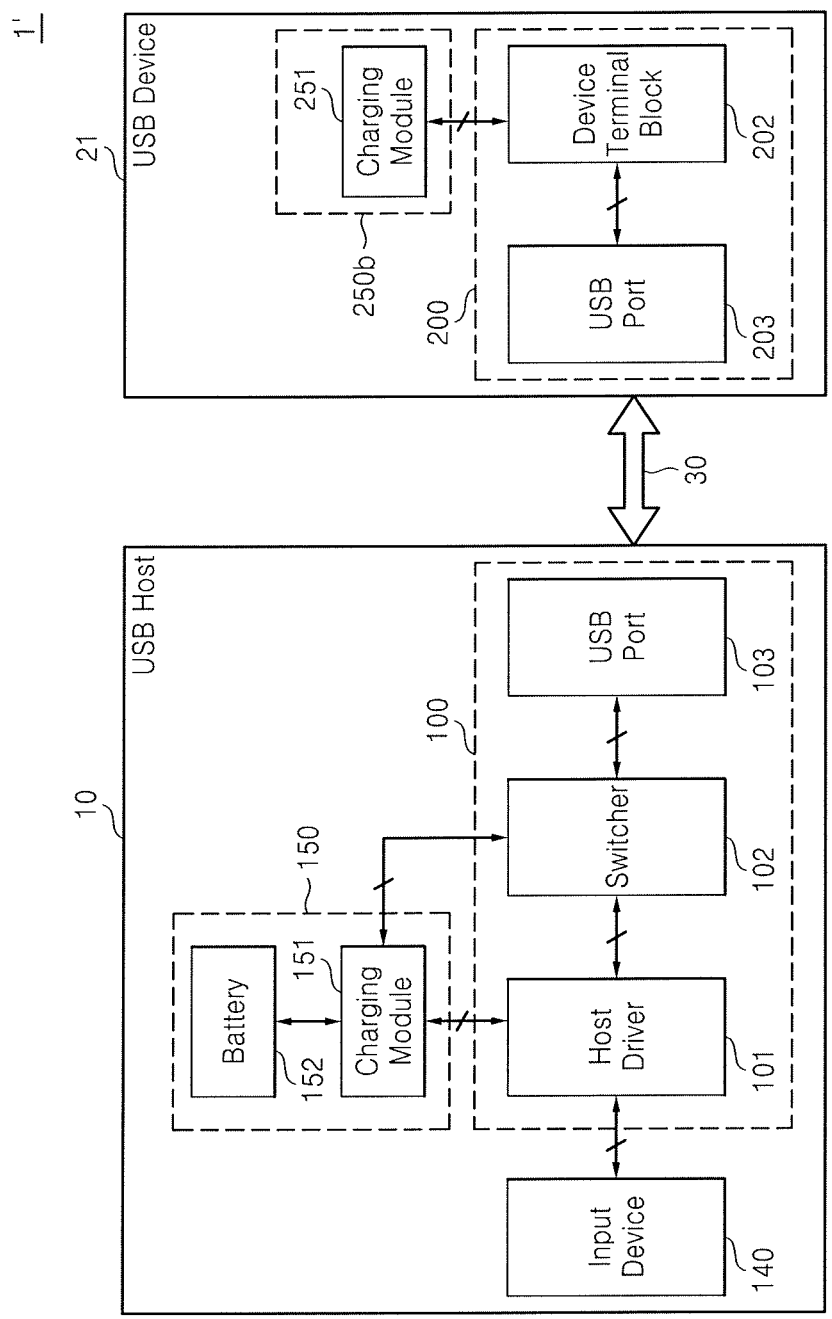
FIG. 4 is a block diagram showing the interface units illustrated in FIG. 2, according to an exemplary embodiment of the inventive concept.

FIG. 4 is a block diagram showing the interface units 100 and 200 illustrated in FIG. 2, according to an exemplary embodiment of the inventive concept. To avoid redundancy, differences between the exemplary embodiments illustrated in FIGS. 3 and 4 will be primarily described.

The USB host 10 of the USB power management system 1' illustrated in FIG. 4 is similar to the USB host 10 illustrated in FIG. 3. The USB device 21 illustrated in FIG. 4 includes a different structure than the USB device 20 illustrated in FIG. 3. For example, the USB device 21 in FIG. 4 includes the power unit 250b.

The power unit 250b of the bus-powered USB device 21 may include the charging module 251, which controls the power supply necessary for the operation of each element of the USB device 21. The power unit 250b does not include a battery. Accordingly, the bus-powered USB device 21 cannot operate without a separate power source (e.g., an alternating current (AC) power supply via the USB host 10, or a travel adapter).

Accordingly, when power is not supplied to the bus-powered USB device 21 from the USB host 10 through the power supply line (Vbus), the power unit 250b cannot maintain data communication even if the data communication line (D+, D−) is connected, since the bus-powered USB device will be without power.

FIG. 5 shows an example of a request that the USB host 10 transmits to the USB device 20 or 21, according to an exemplary embodiment of the inventive concept. FIG. 6 shows an example of a response that the USB device 20 or 21 transmits to the USB host 10 in response to the request of the USB host 10 shown in FIG. 5, according to an exemplary embodiment of the inventive concept.

Referring to FIG. 5, when the USB device 20 or 21 is initially connected to the USB port 103 of the USB host 10, the USB host 10 transmits a get-configuration request GET_CONFIGURATION to the USB device 20 or 21. For example, the USB host 10 sends a request to the USB device 20 or 21 to obtain information indicating whether the USB device 20 or 21 is a self-powered USB device 20 or a bus-powered device USB device 21.

Referring to FIG. 6, the USB device 20 or 21 responds to the get-configuration request GET_CONFIGURATION of the USB host 10 with configuration characteristics information. In the exemplary embodiment shown in FIG. 6, the configuration characteristics information is comprised of eight bits D7 through D0, and includes information regarding the power capability of the USB device 20 or 21. For instance, the power capability of the USB device 20 or 21 may be detected by analyzing the data of bit D6. For example, when the USB device 20 or 21 is a bus-powered USB device 21, bit D6 may be set to 0. When the USB device 20 or 21 is a self-powered USB device 20, bit D6 may be set to 1. The number of bits included in the configuration characteristics information, and the designation of which bits indicate which information, is not limited to the exemplary embodiments shown in FIGS. 5 and 6. For example, the configuration characteristics information may include more or less than 8 bits, and any of the bits may be used to indicate the power capability of the USB device 20 or 21. Further, in an exemplary embodiment, bit D6 may be set to 0 for a self-powered USB device 20, and 1 for a bus-powered USB device 21.

FIG. 7 shows an example of a request that the USB host 10 transmits to the USB device 20 or 21, according to an exemplary embodiment of the inventive concept. FIG. 8 shows an example of a response that the USB device 20 or 21 transmits to the USB host 10 in response to the request of the USB host 10 shown in FIG. 7, according to an exemplary embodiment of the inventive concept.

Referring to FIG. 7, during runtime while the USB device 20 or 21 is connected to the USB port 103 of the USB host 10, the USB host 10 transmits a get-status request GET_STATUS to the USB device 20 or 21. For example, the USB host 10 sends a request to the USB device 20 or 21 to obtain information indicating whether the USB device 20 or 21 is a self-powered USB device 20 or a bus-powered USB device 21.

The USB device 20 or 21 sends a response to the USB host 10, as shown in FIG. 8. In the exemplary embodiment shown in FIG. 8, the response includes configuration characteristics information comprised of 16 bits D15 through D0, and includes the power capability of the USB device 20 or 21.

For instance, the power capability of the USB device 20 or 21 may be detected by analyzing the data of bit D0. For example, when the USB device 20 or 21 is a bus-powered USB device 21, bit D0 may be 0. When the USB device 20 or 21 is a self-powered USB device 20, bit D0 may be 1. The number of bits included in the configuration characteristics information, and the designation of which bits indicate which information, is not limited to the exemplary embodiments shown in FIGS. 7 and 8. For example, the configuration characteristics information may include more or less than 16 bits, and any of the bits may be used to indicate the power capability of the USB device 20 or 21. Further, in an exemplary embodiment, bit D0 may be set to 1 for a bus-powered USB device 21, and 0 for a self-powered USB device 20.

FIG. 9 is a table showing the power and data connection states when the USB host 10 illustrated in FIGS. 1 and 2 is set to the power saving mode.

Referring to FIG. 9, in an exemplary embodiment, the USB host 10 includes a first predetermined power threshold. When the current power level of the USB host 10 is equal to at least the first predetermined power threshold value, the USB host 10 operates in a normal mode. When the current power level of the USB host 10 is less than the first predetermined power threshold value, the USB host 10 operates in a power saving mode, which includes three power levels L1, L2, and L3. While in the normal mode, the USB host 10 has sufficient power to supply power to the USB device 20 or 21 via the power connection (Vbus On), and to transmit and receive data to and from the USB device 20 or 21 via the data communication connection (e.g, Configured, D+/− On). In addition to the mode of the USB host 10 being automatically set by the USB host 10 as described above, the mode of the USB host 10 may also be manually set based on a user's input.

The USB host 10 checks the remaining power of the battery 152 and generates a notification signal indicating the remaining power. Once notified, the user may provide an input to the USB host 10 indicating whether to enter the power saving mode. The notification signal may be generated when the remaining power of the battery 152 is less than or equal to the first predetermined power threshold value.

In exemplary embodiments, the USB host 10 may be set to automatically enter the power saving mode when the remaining power of the battery 152 is less than the first predetermined power threshold value. At this time, the first power threshold value may be set to at least two predetermined values, so that the connection with the USB device 20 is set to one of the first through third power levels L1 through L3.

In exemplary embodiments, a user may provide an input via the input device 140 to set the USB host 10 to one of the first through third power levels L1 through L3 of the power saving mode. As the power saving mode transitions from the first power level L1 to the third power level L3, power consumption decreases.

An example including the USB host 10 connected to at least one first self-powered USB device 20 and at least one second bus-powered USB device 21 simultaneously is described below.

As shown in FIG. 9, at the first power level L1, the power supply connection (Vbus) to the self-powered USB device 20 is interrupted (Off), and the data communication connection (D+/−) to the self-powered USB device 20 is maintained (Configured). At the same time, the power supply connection (Vbus) to the bus-powered USB device 21 is maintained (On), and the data communication connection (D+/−) to the bus-powered USB device 21 is maintained (Configured). When a USB device is in the configured state, the USB device is connected to the USB host 10, is supplied with power, and is able to communicate data with the USB host 10.

At the second power level L2, the power supply connection (Vbus) to the self-powered USB device 20 is interrupted (Off), and the data communication connection (D+/−) to the self-powered USB device 20 is maintained (Configured). At the same time, the power supply connection (Vbus) to the bus-powered USB device 21 is interrupted (Off), and the data communication connection (D+/−) to the bus-powered USB device 21 is interrupted (Attached). When a USB device is in the attached state, the USB device is connected to the USB host 10, but does not receive power from the USB host 10 and is not able to communicate data with the USB host 10.

At the third power level L3, the power supply connection (Vbus) to the self-powered USB device 20 is interrupted (Off), and the data communication connection (D+/−) to the self-powered USB device 20 is also interrupted (Powered). At the same time, the power supply connection (Vbus) to the bus-powered USB device 21 is interrupted (Off), and the data communication connection (D+−) to the bus-powered USB device 21 is interrupted (Attached).

Comparing the first and second power levels L1 and L2, the USB host 10 does not supply power to the self-powered USB device 20, supplies power to the bus-powered USB device 21, and communicates data with both the self-powered and bus-powered USB devices 20 and 21 at the first power level L1. While in the second power level L2, the USB host 10 does not supply power to either the self-powered or bus-powered USB device 20 or 21, and communicates data with only the self-powered USB device 20.

Since the USB host 10 only consumes power for its own operation and does not supply power to external devices (e.g., USB devices 20 and 21) while in the second power level L2, power consumption at the second power level L2 may be reduced compared to power consumption at the first power level L1. Further, the data communication connection between the USB host 10 and the self-powered USB device 20 is maintained independently from the power supply connection. As a result, data transmission and reception may be maintained at the second power level L2.

Comparing the second and third power levels L2 and L3, the USB host 10 does not supply power to either the self-powered or bus-powered USB device 20 or 21, and communicates data with only the self-powered USB device 20 at the second power level L2. While in the third power level L3, the USB host 10 does not supply power to either the self-powered or bus-powered USB device 20 or 21, and does not communicate data with either the self-powered or bus-powered USB device 20 or 21.

Since the USB host 10 only consumes power necessary for its own operation, and further, does not consume power for data communication with an external device (e.g., the self-powered USB device 20 or the bus-powered USB device 21) at the third power level L3, power consumption at the third power level L3 may be reduced compared to power consumption at the second power level L2.

Figure 10A:
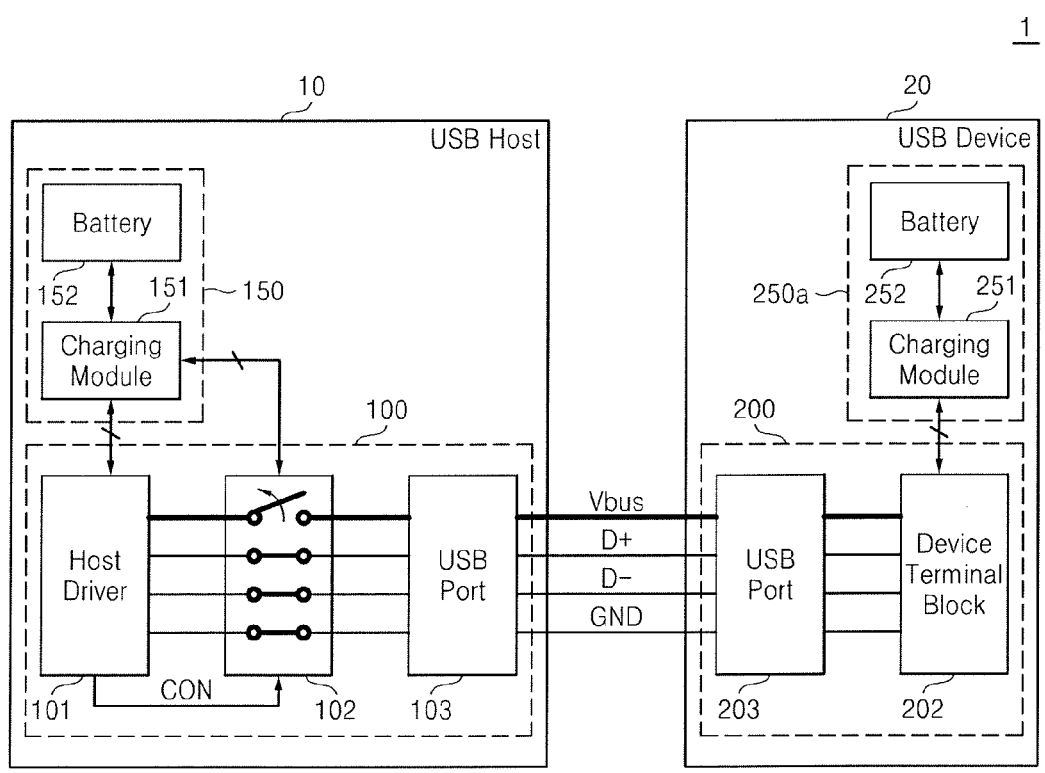
FIG. 10A is a block diagram of the USB power management system of FIGS. 1 and 2 operating in the power saving mode, according to an exemplary embodiment of the inventive concept.
Figure 10B:
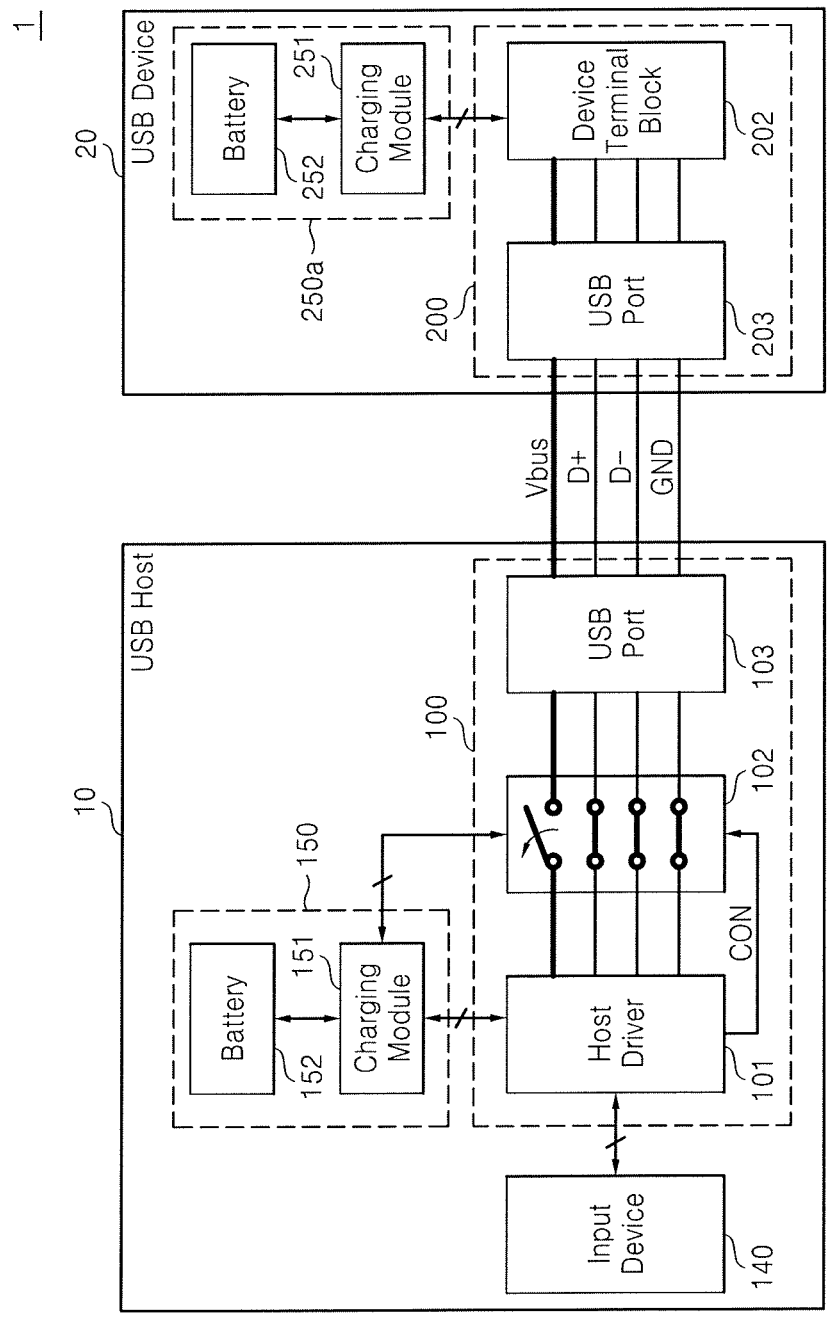
FIG. 10B is a block diagram of the USB power management system of FIG. 1 operating in the power saving mode, according to an exemplary embodiment of the inventive concept.

FIG. 10A is a block diagram of the USB power management system 1 and 1' of FIGS. 1 and 2 operating in the power saving mode, according to an exemplary embodiment of the inventive concept. FIG. 10B is a block diagram of the USB power management system 1 and 1' of FIGS. 1 and 2 operating in the power saving mode, according to an exemplary embodiment of the inventive concept.

Referring to FIGS. 3, 4 and 10A, when the self-powered USB device 20 is connected to the USB host 10, the charging module 151 checks the state of the battery 152 of the USB host 10, and informs the host driver 101 of the state of the battery 152. When a low power state is determined (e.g., a power state in which the remaining power of the battery 152 is lower than a predetermined power reference value), the host driver 101 generates a notification signal indicating the low power state. The power reference value may include at least two first power threshold values and at least two second power threshold values, however, the power reference value is not limited thereto.

In an exemplary embodiment, the host driver 101 is connected to the switcher 102, and controls the switching operation of the power connection and the data communication connection based on a comparison result obtained by comparing the remaining power of the battery 152 with the first power threshold value.

An example of a USB power management system requiring that the data communication be maintained between the USB host 10 and the connected USB device(s) (e.g., the self-powered USB device 20 or the bus-powered USB device 21) is described below.

In order to conserve the remaining power of the battery 152 of the USB host 10, the switcher 102, under the control of the host driver 101, turns off (e.g., deactivates) the power supply connection Vbus to the self-powered USB device 20 and turns on (e.g., activates) the power supply connection Vbus to the bus-powered USB device 21. Further, the switcher 102, under the control of the host driver 101, turns on (e.g., activates) the data communication connection D+/D− to both the self-powered and bus-powered USB devices 20 and 21 to maintain data communication with both devices.

That is, to the switcher 102, under the control of the host driver 101, turns off (e.g., deactivates) a current input path to the self-powered USB device 20 to interrupt the power supply connection Vbus, and turns on (e.g., activates) a data transmission/reception path to maintain the data communication connection D+/D−.

Referring to FIG. 10B, when the low power state is determined (e.g., a power state in which the remaining power of the battery 152 is lower than a predetermined power reference value), the host driver 101 generates a notification signal indicating the low power state. The power reference value may include at least two first power threshold values and at least two second power threshold values, however the power reference value is not limited thereto.

In FIG. 10B, a user sets one of the power levels of the power saving mode using the input device 140 in response to the notification signal generated by the host driver 101. Thus, the host driver 101 controls the switching operation of the power connection and data communication connection in response to the input signal input by a user.

FIG. 11 is a table showing the power and data connection states when the USB host 10 illustrated in FIGS. 1 and 2 is set to a power charging mode.

Referring to FIG. 11, in an exemplary embodiment, the USB host 10 operates in the normal mode or the power saving mode when the current power of the USB host 10 is at least equal to a predetermined second power threshold value, and the USB host 10 is set to operate in one of first through third power levels L1 through L3 of the power charging mode while in a low power state (e.g., when the current power of the USB host 10 is less than the predetermined second power threshold value). In an exemplary embodiment, the USB host 10 operates in the normal mode when the current power of the USB host 10 is at least equal to a predetermined first power threshold value, and operates in the power saving mode when the current power is less than the first power threshold value and greater than the second power threshold value. Further, the USB host 10 is set to one of the first through third power levels L1 through L3 of the power charging mode at the low power state (e.g., when the current power of the USB host 10 is less than the predetermined second power threshold value). Such settings may be automatically configured by the USB host 10 (see FIG. 10A), or may be manually configured by a user (see FIG. 10B).

In the normal mode, the USB host 10 has a sufficient level of power to supply power to the self-powered USB device 20 via the power connection (Vbus On), and to transmit and receive data to and from the self-powered USB device 20 via the data communication connection (Configured, D+/− On).

The USB host 10 checks the remaining power of the battery 152 and generates a notification signal indicating the remaining power. In response to receiving this notification signal, a user may determine whether to enter the power charging mode. The notification signal may be generated when the remaining power of the battery 152 is less than or equal to the predetermined second power threshold value.

Alternatively, in exemplary embodiments, the USB host 10 may be set to automatically enter the power charging mode when the remaining power of the battery 152 is less than the second power threshold value. The second power threshold value may be set to at least two predetermined values, and the connection with the USB device 20 may be set to one of the first through third power levels L1 through L3.

In exemplary embodiments, a user may set the USB host 10 to one of the first through third power levels L1 through L3 of the power charging mode using the input device 140. When the power mode transitions from the first power level L1 to the third power level L3, power consumption of the USB host 10 may increase.

An example of a USB power management system having a USB host 10 connected simultaneously with at least one first self-powered USB device 20 and at least one second bus-powered USB device 21 is described below.

The battery 252 of the self-powered USB device 20 may be used to charge the battery 152 of the USB host 10. As a result, errors in the data communication connection between the USB host 10 and the self-powered USB device 20 can be prevented, and the USB host 10 can be supplied with auxiliary power for its operation.

At the first power level L1, the power connection to the self-powered USB device 20 is set as a power charging connection (Charging input) and the data communication connection (D+/−) is maintained (Configured). At the same time, the power supply connection (Vbus) to the bus-powered USB device 21 is maintained (On), and the data communication connection (D+/−) is also maintained (Configured). When a USB device is in the configured state, the USB device is connected to the USB host 10, is supplied with power, and is able to communicate data with the USB host 10. When a USB device is in the charging input state, a current flow in the power supply line Vbus/GND is reversed, and a battery of the USB device is utilized to charge the battery of the USB host.

At the second power level L2, the power connection to the self-powered USB device 20 is set as a power charging connection (Charging input) and the data communication connection (D+/−) is maintained (Configured). At the same time, the power supply connection (Vbus) to the bus-powered USB device 21 is interrupted (Off), and the data communication connection (D+/−) is also interrupted (Attached). When a USB device is in the attached state, the USB device is connected to the USB host 10 but is not supplied with power from the USB host 10. Since the bus-powered USB device 21 does not include a battery, it cannot be used to charge the battery 152 of the USB host 10.

At the third power level L3, the power connection to the self-powered USB device 20 is set as a power charging connection (Charging input) and the data communication connection (D+/−) is interrupted (Powered). At the same time, the power supply connection (Vbus) to the bus-powered USB device 21 is interrupted (Off) and the data communication connection (D+/−) is also interrupted (Attached).

Comparing the first and second power levels L1 and L2, the USB host 10 supplies power to the bus-powered USB device 21 while being charged with power from the self-powered USB device 20, and communicates data with both the self-powered and bus-powered USB devices 20 and 21 at the first power level L1. At the second power level L2, the USB host 10 does not supply power to the bus-powered USB device 21 while being charged with power from the self-powered USB device 20, and communicates data only with the self-powered USB device 20.

As a result, at the second power level L2, the USB host 10 consumes power only for its own operation without supplying power to an external device such as the bus-powered USB device 21 while being charged with power from the self-powered USB device 20. Thus, the USB host 10 receives a greater charge from the self-powered USB device 20 at the second power level L2 than at the first power level L1.

Comparing the second and third power levels L2 and L3, the USB host 10 does not supply power to the bus-powered USB device 21 while being charged with power from the self-powered USB device 20, and communicates data with only the self-powered USB device 20 at the second power level L2. At the third power level L3, the USB host 10 does not supply power to the bus-powered USB device 21 while being charged with power from the self-powered USB device 20, and the USB host 10 interrupts the data communication connection with the self-powered USB device 20 as well as with the bus-powered USB device 21.

As a result, at the third power level L3, the USB host 10 only consumes power necessary for its own operation while being charged with power from the self-powered USB device 20, and does not consume power for data communication with an external device such as the self-powered or bus-powered USB devices 20 and 21. Thus, the USB host 10 receives a greater charge at the third power level L3 than at the second power level L2.

In the exemplary embodiments described above, the battery 252 in the self-powered USB device 20 may need a predetermined amount of remaining power to initiate charging the battery 152 of the USB host 10. The USB host 10 receives information indicating the remaining power of the self-powered USB device 20, and determines whether to enter the power charging mode based on this information. In an exemplary embodiment, the information indicating the remaining power of the self-powered USB device 20 may be generated as a notification signal for a user. The user may determine whether to set the USB host 10 to the power charging mode based on this information.

Figure 12:
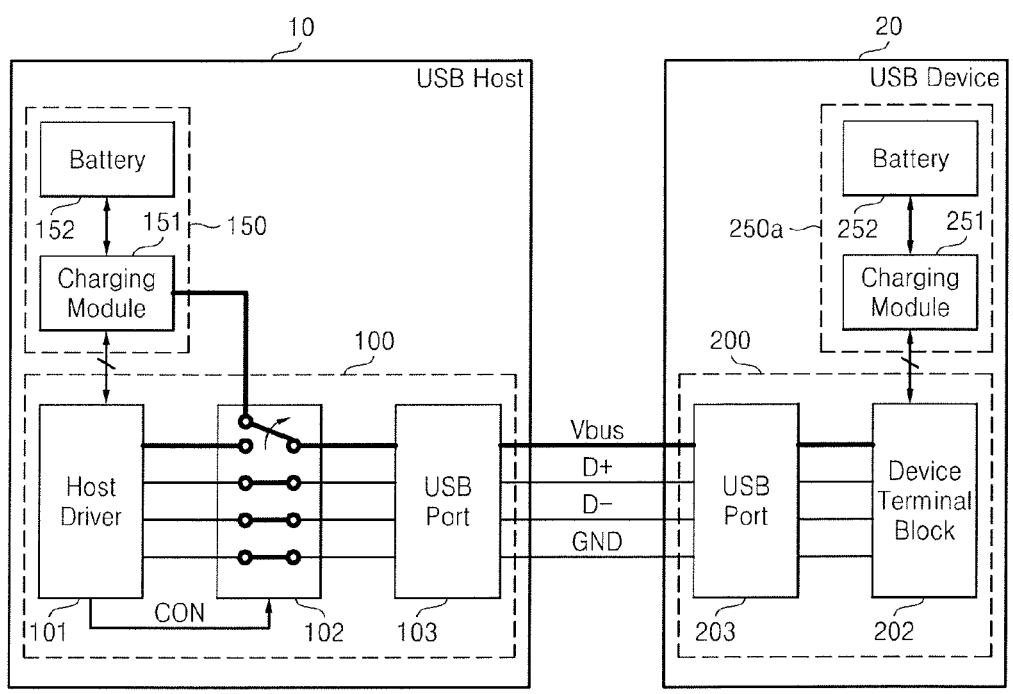
FIG. 12 is a block diagram of the USB power management system of FIG. 1 operating in the first power level of the power charging mode, according to an exemplary embodiment of the inventive concept.
Figure 13:
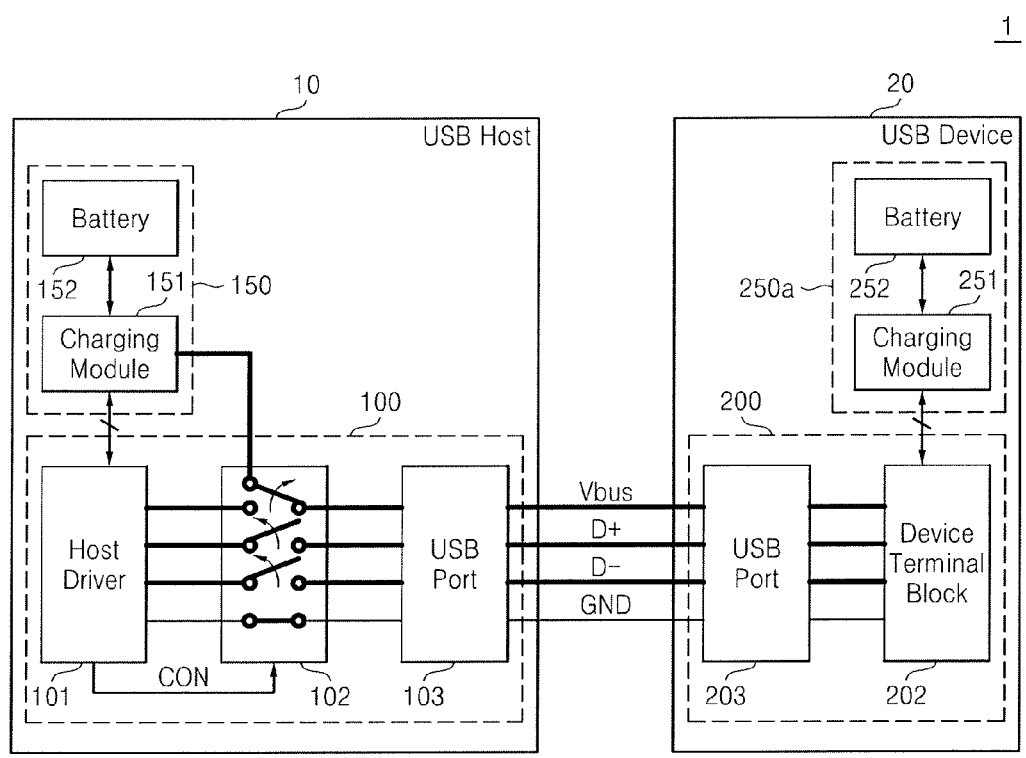
FIG. 13 is a block diagram of the USB power management system of FIG. 1 operating in power levels other than the first power level of the power charging mode, according to an exemplary embodiment of the inventive concept.

FIG. 12 is a block diagram of the USB power management system 1 of FIG. 1 operating in the first power level of the power charging mode, according to an exemplary embodiment of the inventive concept. FIG. 13 is a block diagram of the USB power management system 1 of FIG. 1 operating in power levels other than the first power level of the power charging mode, according to an exemplary embodiment of the inventive concept.

Referring to FIG. 12, when the self-powered USB device 20 is connected to the USB host 10, the charging module 151 checks the remaining power of the battery 152 of the USB host 10 and informs the host driver 101 of the remaining power. When a low power state is determined (e.g., a power state in which the remaining power of the battery 152 is lower than a predetermined power reference value), the host driver 101 generates a notification signal indicating the low power state. The power reference value may include at least two first power threshold values and at least two second power threshold values. The notification signal may be generated when the remaining power of the battery 152 is less than or equal to the predetermined second power threshold value.

The host driver 101 controls the switching operation of the power connection and the data communication connection according to a comparison result based on comparing the remaining power of the battery 152 with the second power threshold value.

Alternatively, a user may set one of the first through third power levels of the power charging mode using the input device 140 in response to the notification signal, and the host driver 101 may control the switching operation of the power connection and the data communication connection in response to an input signal generated by the user.

An example of a USB power management system requiring that the data communication be maintained between the USB host 10 and the USB device(s) (e.g., the self-powered USB device 20 and the bus-powered USB device 21) is described below.

The switcher 102, under the control of the host driver 101, reverses the input/output direction of the power from the self-powered USB device 20 to charge the USB host 10. In addition, the switcher 102, under the control of the host driver 101, maintains the data communication connection D+/D− to the self-powered USB device 20 for data communication with the self-powered USB device 20.

That is, according to the control of the host driver 101, the switcher 102 reverses the current flow to the self-powered USB device 20 to charge the USB host 10, but maintains the data communication connection D+/D− to continue data transmission/reception.

In FIG. 13, an example of the USB power management system 1 of FIG. 1 where the power charging connection between the USB host 10 and the self-powered USB device 20 is maintained, and the data communication between the USB host 10 and the self-powered USB device 20 is interrupted is described below. To avoid redundancy, differences between the exemplary embodiments illustrated in FIGS. 12 and 13 will be primarily described.

The switcher 102, under the control of the host driver 101, reverses the input/output direction of the power from the self-powered USB device 20, resulting in the USB host 10 being charged with power via the self-powered USB device 20. The switcher 102, under the control of the host driver 101, interrupts the data communication connection D+/D− to and from the first USB device 20.

Figure 14:
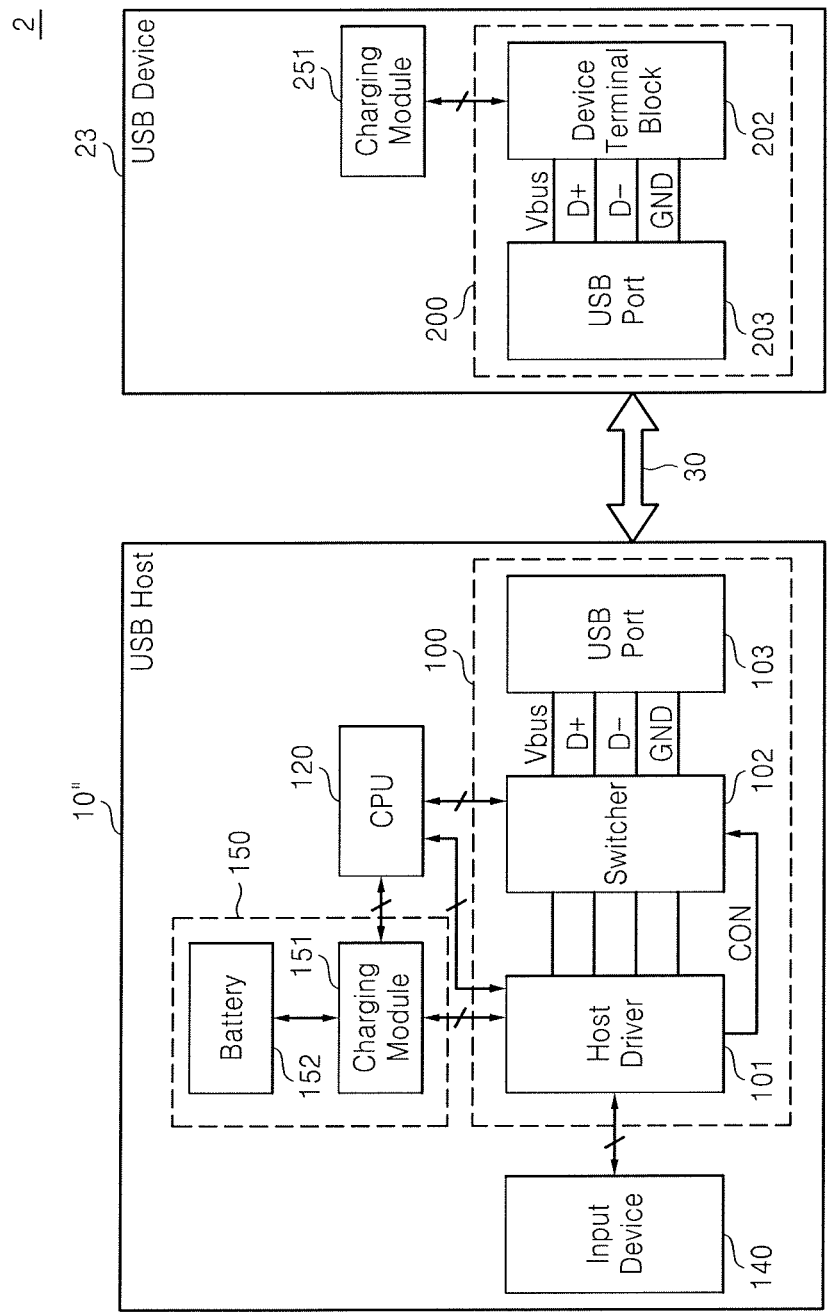
FIG. 14 is a block diagram of a USB power management system, according to an exemplary embodiment of the inventive concept.

FIG. 14 is a block diagram of a USB power management system 2, according to an exemplary embodiment of the inventive concept.

The USB power management system 2 illustrated in FIG. 14 includes a USB host 10″ and a USB device 23. To avoid redundancy, differences between the USB power management system 2 in FIG. 14 and the USB power management systems 1 and 1′ illustrated in FIGS. 3 and 4 will be primarily described.

The USB host 10″ includes the interface unit 100, the bus 110 (see FIG. 1), the CPU 120, the memory unit 130 (see FIG. 1), the input device 140, and the power unit 150.

The CPU 120 controls the overall operation of the USB host 10″. The memory unit 130 stores parameters and data that are used for the operation of the USB host 10". The input device 140 is a device such as, for example, a touch sensor, a button sensor, a motion sensor, a speech recognition module, a temperature sensor, or a camera sensor, which receives an input from a user and converts the input into an electrical signal.

The power unit 150 manages the power supply of the USB host 10" and includes the battery 152 and the charging module 151.

The CPU 120 illustrated in FIG. 14 controls the overall operation related to the connection between the USB host 10" and the USB device 23. When the current power of the USB host 10", which is sensed by the charging module 151, is determined to be low relative to a predetermined power reference value, the CPU 120 may display a notification signal indicating the low power state through a display unit of the USB host 10", and set the mode of the USB host 10" based on a signal input by the user through the input device 140. The mode of the USB host 10" may be one of the modes described above, including the normal mode, one of the first through third power levels of the power saving mode, or one of the first through third power levels of the power charging mode. The CPU 120 controls the switching operation of the switcher 102 according to the mode of the USB host 10", and the type of USB device 23 connected to the USB host 10" (e.g., the USB device 23 may be a self-powered USB device or a bus-powered USB device).

The host driver 101 detects that the USB device 23 has been connected to the USB host 10", detects whether the USB device 23 is a self-powered USB device or a bus-powered USB device, and informs the CPU 120 of the type of USB device 23 connected.

The switcher 102 switches the data communication connection and the power connection with the USB port 103 under the control of the CPU 120. For example, the switcher 102 switches power lines Vbus and GND to control power supply and charge settings, and separately switches data communication lines D+ and D− to control the connection and disconnection of data communication.

The host driver 101 may detect the type of USB device 23 connected based on a response of the USB device 23 to a get-configuration request (see FIG. 5), which is sent by the USB host 10" to the USB device 23 when the USB device 23 is initially connected to the USB port 103. Alternatively, the host driver 101 may detect the type of USB device 23 connected based on a response of the USB device 23 to a get-status request (see FIG. 7), which is sent by the USB host 10" to the USB device 23 while the USB device 23 is connected to the USB port 103.

Figure 15:
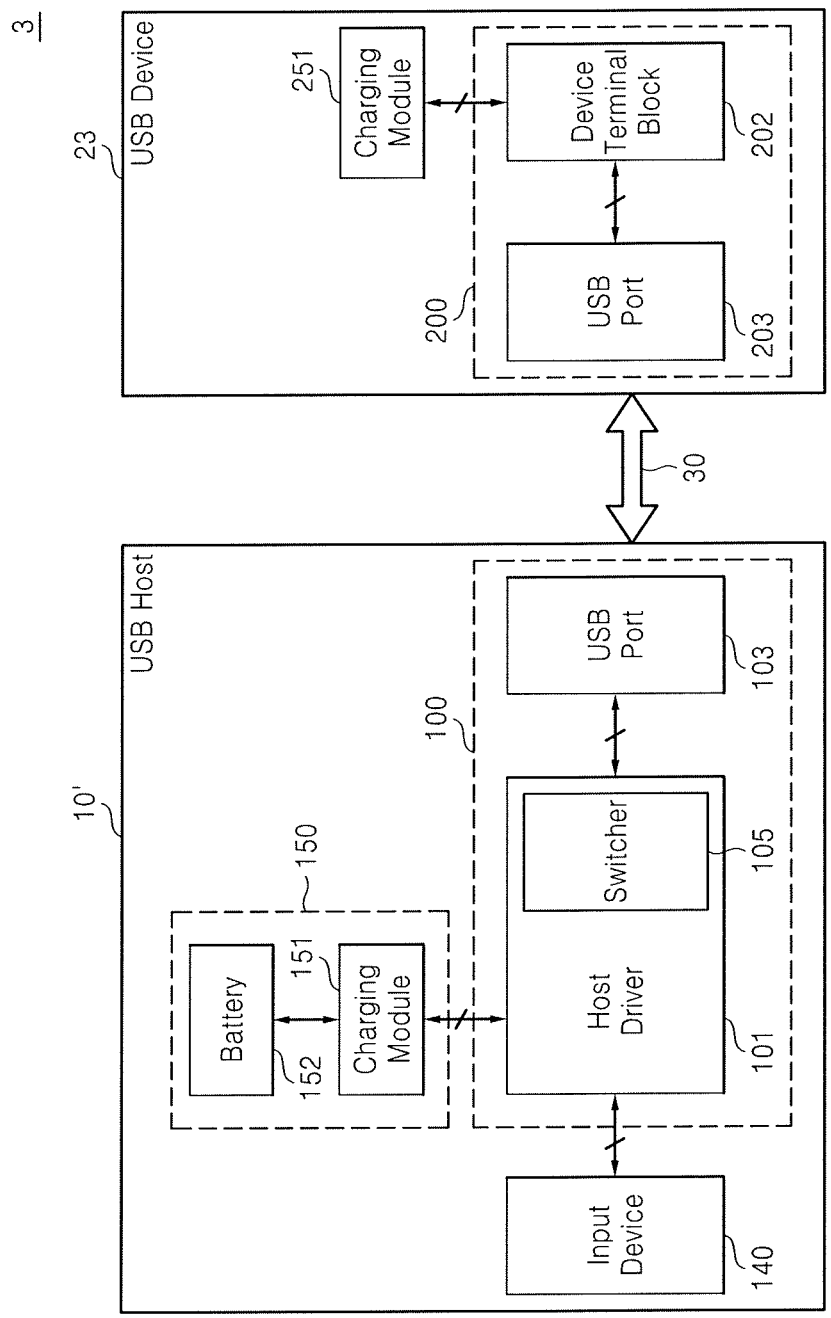
FIG. 15 is a block diagram of a USB power management system, according to an exemplary embodiment of the inventive concept.

FIG. 15 is a block diagram of a USB power management system 3, according to an exemplary embodiment of the inventive concept.

Referring to FIG. 15, the USB interface unit 100 includes the USB port 103 and the host driver 101.

The USB port 103 interfaces with the USB device 23 through the power supply lines Vbus and GND, and the data communication lines D+ and D−.

The host driver 101 is connected to the charging module 151 and determines whether the USB device 23 is interfaced with the interface unit, and the type of the USB device 23 that has been interfaced. The host driver 101 switches the connection of the data communication line or the power supply line to the USB port 103 based on the type of the USB device 23 (e.g., the USB device may be a self-powered USB device or a bus-powered USB device), the remaining power of the battery 152, or an input signal received from a user.

The host driver 101 illustrated in FIG. 15 may include a switcher 105 that switches the connection of the data communication line or the power supply line to the USB port 103. The host driver 101 controls the USB interface unit 100, determines whether the USB device 23 is interfaced with the USB interface unit, and determines the type of the USB device 23 that has been interfaced. The host driver 101 may separately control the data communication line and the power supply line connected to the USB device 23 based on the type of the USB device 23, the remaining power of the battery 152, or an input signal received from a user.

Figure 16:
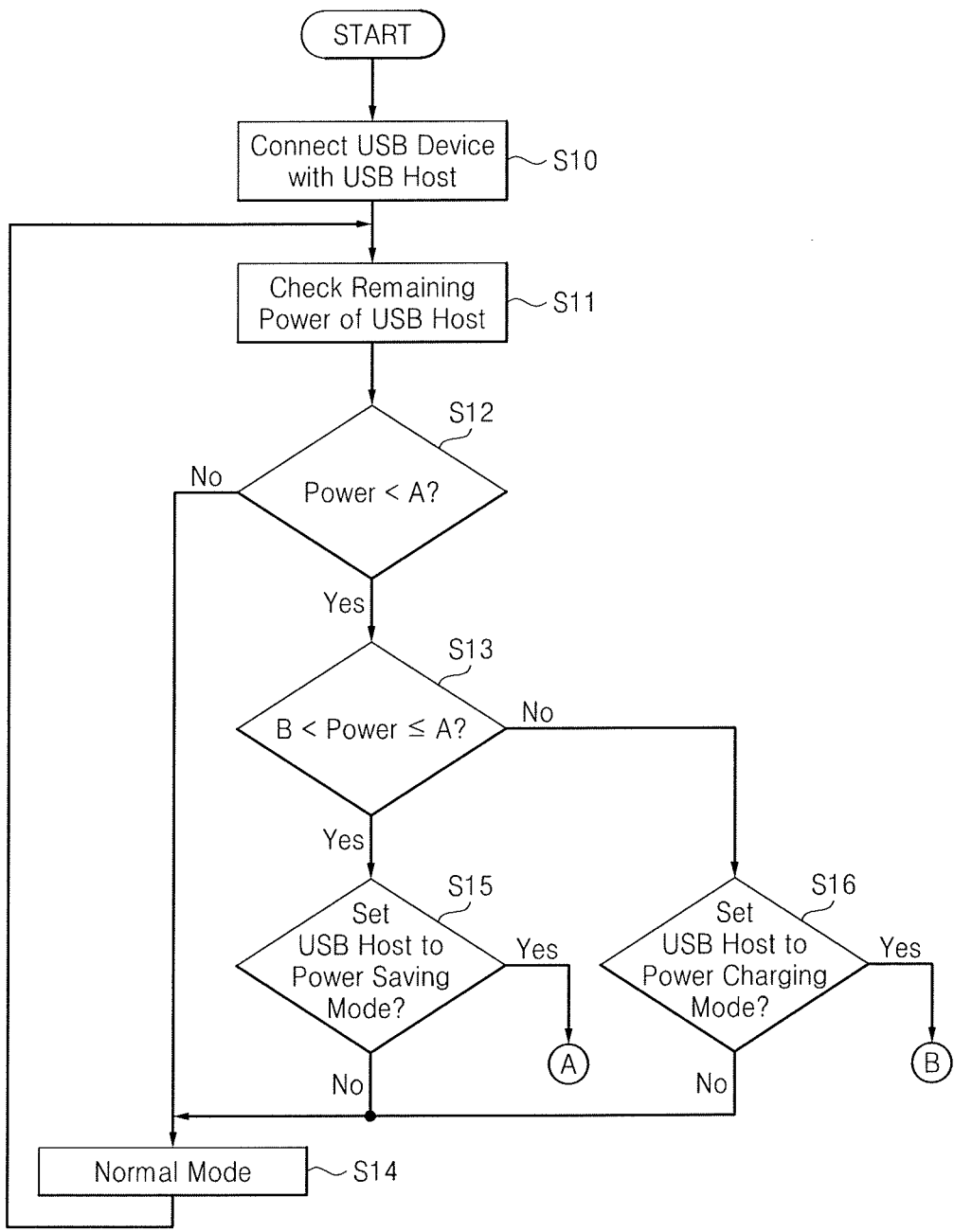
FIG. 16 is a flowchart of a power management method of a USB host, according to an exemplary embodiment of the inventive concept.
Figure 17:
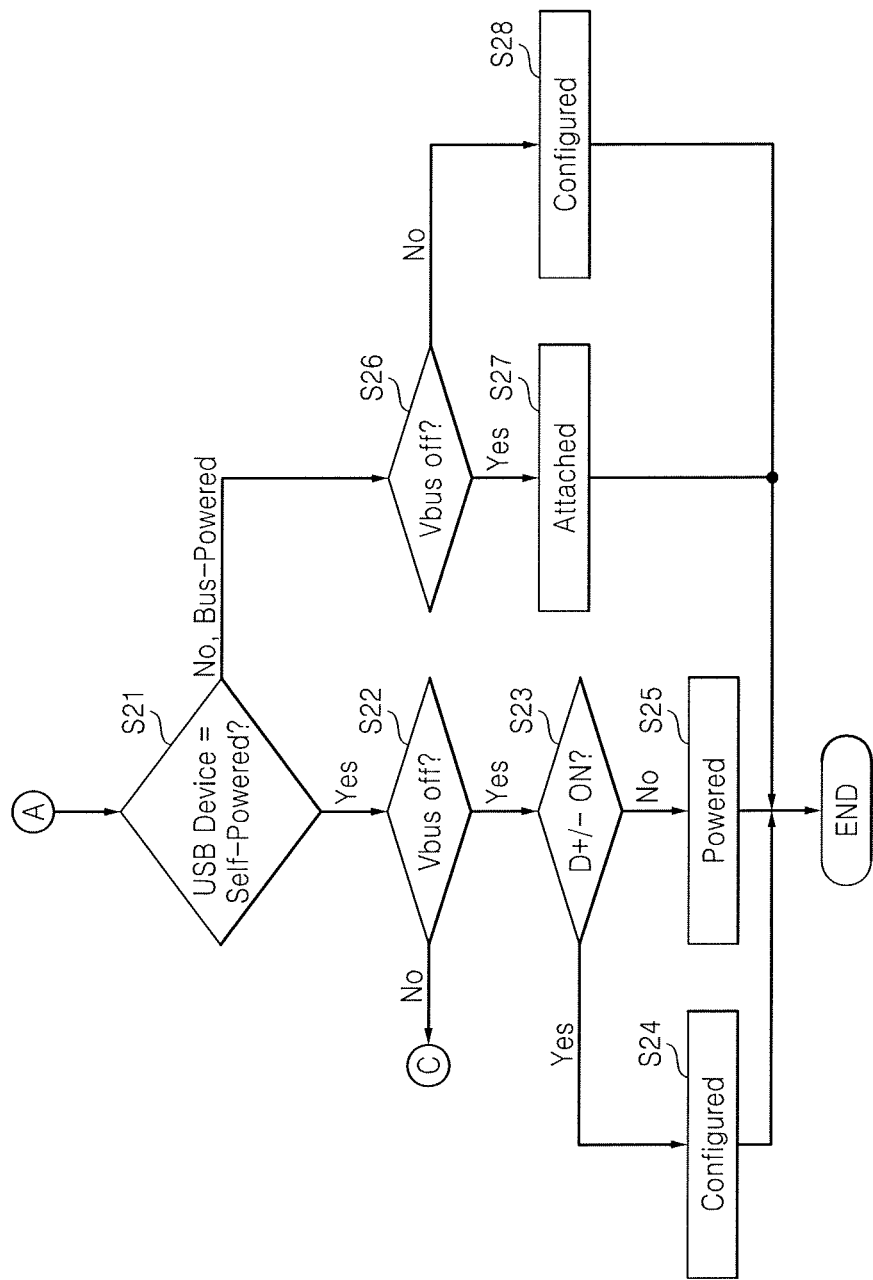
FIG. 17 is a flowchart of the power management method of a USB host while in the power saving mode, according to an exemplary embodiment of the inventive concept.
Figure 18:
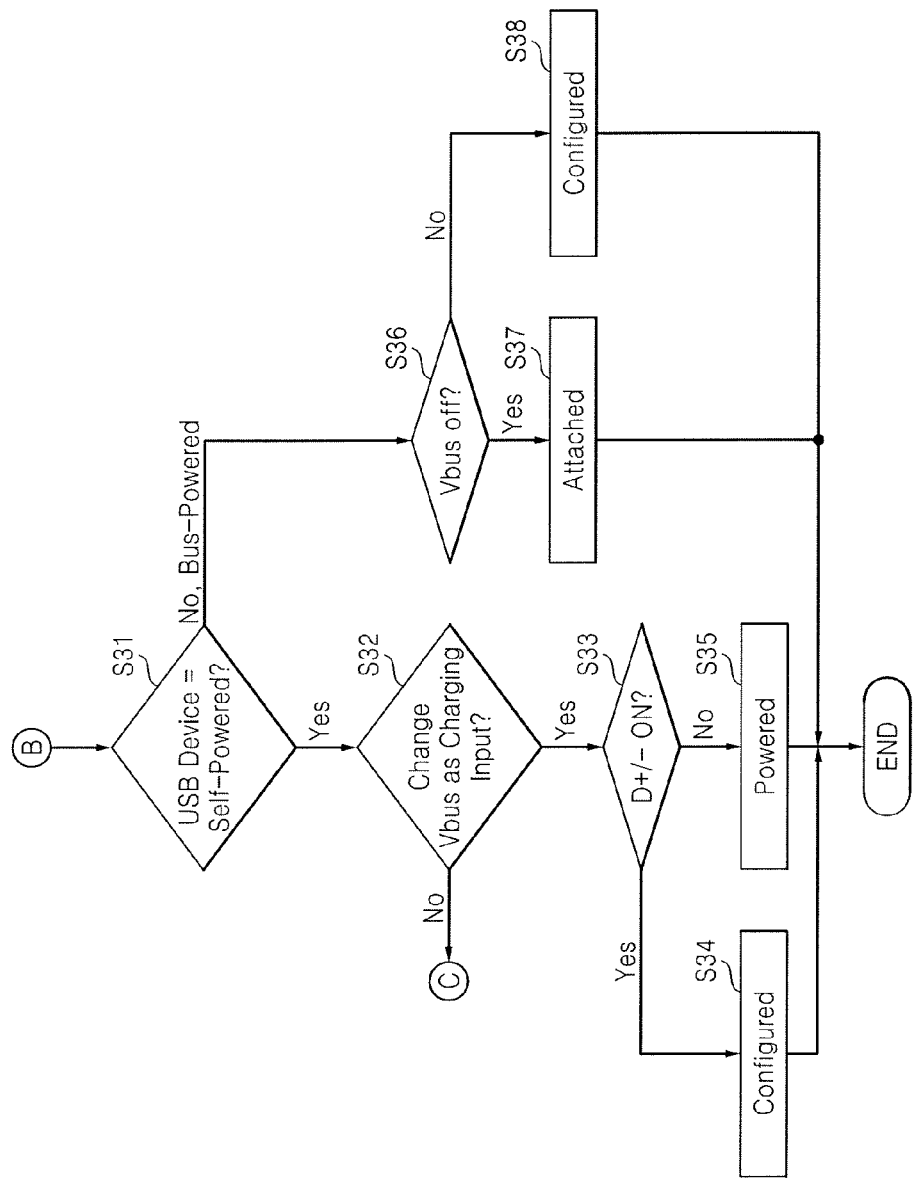
FIG. 18 is a flowchart of the power management method of a USB host while in the power charging mode, according to an exemplary embodiment of the inventive concept.

FIG. 16 is a flowchart of a power management method of the USB host 10, according to an exemplary embodiment of the inventive concept. FIG. 17 is a flowchart of the power management method of the USB host 10 while in the power saving mode, according to an exemplary embodiment of the inventive concept. FIG. 18 is a flowchart of the power management method of the USB host 10 while in the power charging mode, according to an exemplary embodiment of the inventive concept. In FIGS. 16-18, reference is made to the USB host 10 shown in FIGS. 1-4, 10A-10B, and 12-13, however the methods described with reference to FIGS. 16-18 may also be utilized with the USB hosts 10" and 10' of FIGS. 14-15.

Referring to FIG. 16, at least one USB device is connected with the USB host 10 in operation S10. The USB host 10 checks the remaining power of the battery 152 of the USB host 10, and generates a notification signal indicating the remaining power in operation S11.

When the remaining power of the battery 152 is greater than a first power threshold value A in operation S12, the USB host 10 operates in the normal mode under the control of the host driver 101 in operation S14. When the remaining power of the battery 152 is less than the first power threshold value A in operation S12, the USB host 10 operates in either the power saving mode in operation S15 or the power charging mode in operation S16. When the remaining power of the battery 152 is less than or equal to the first power threshold value A, and is greater than a second power threshold value B in operation S13, the USB host 10 operates in the power saving mode in operation S15. If the remaining power of the battery 152 is less than the power threshold value B in operation S13, the USB host 10 operates in the power charging mode in operation S16.

The USB host 10 may be set to the power saving mode in operation S15 or the power charging mode in operation S16 based on a control signal of the host driver 101, or a signal input by a user in response to the notification signal.

When the USB host 10 is set to the power saving mode in operation S15, the data communication connection with the USB device may be separately managed from the power connection with the USB device, allowing the data communication to be continued while the power connection is disconnected.

When the USB host 10 is set to the power charging mode in operation S16, the data communication connection with the USB device may be managed, and the USB host 10 may be supplied with power from the USB device if the USB device is a self-powered USB device.

When the USB host 10 is in neither the power saving mode nor the power charging mode, the USB host 10 operates in the normal mode in operation S14 and continuously checks the remaining power of the battery 152.

Referring to FIG. 17, when the USB host 10 is set to the power saving mode, the USB host 10 sends a get-configuration request to the USB device 20 or 21 when the USB device 20 or 21 is initially connected with the USB host 10, and sends a get-status request to the USB device 20 or 21 while the USB device 20 or 21 is connected with the USB host 10. The USB host 10 receives a response to the get-configuration request or the get-status request from the USB device 20 or 21, and detects the type of the USB device 20 or 21 in operation S21. For example, the USB device may be a self-powered USB device 20 or a bus-powered USB device 21.

When the USB host 10 turns on (e.g., activates) a power supply line Vbus to the self-powered USB device 20 in operation S22, the USB host 10 operates in the normal mode with respect to the self-powered USB device 20 in operation S14.

When the power supply line Vbus connected to the self-powered USB device 20 is turned off (e.g., deactivated) in operation S22, and when a data communication line D+/− between the USB host 10 and the self-powered USB device 20 is turned on (e.g., activated) in operation S23, the USB host 10 operates in the configured state with respect to the self-powered USB device 20 in operation S24.

When the power supply line Vbus connected to the self-powered USB device 20 is turned off (e.g., deactivated) in operation S22, and when the data communication line D+/− between the USB host 10 and the self-powered USB device 20 is turned off (e.g., deactivated) in operation S23, the USB host 10 operates in the powered state with respect to the self-powered USB device 20 in operation S25.

When the USB host 10 turns on (e.g., activates) a power supply line Vbus connected to the bus-powered USB device 21 in operation S26, the USB host 10 operates in the configured state with respect to the bus-powered USB device 21 in operation S28.

When the power supply line Vbus connected to the bus-powered USB device 21 is turned off (e.g., deactivated) based on an input received from the user in operation S26, the USB host 10 operates in the attached state with respect to the bus-powered USB device 21 in operation S27.

Referring to FIG. 18, when the USB host 10 is set to the power charging mode, the USB host 10 sends a get-configuration request to the USB device 20 or 21 when the USB device 20 or 21 is initially connected with the USB host 10, and sends a get-status request to the USB device 20 or 21 while the USB device 20 or 21 is connected with the USB host 10. The USB host 10 receives a response to the get-configuration request or the get-status request from the USB device 20 or 21, and detects the type of the USB device 20 or 21 (e.g., the USB device may be a self-powered USB device 20 or a bus-powered USB device 21) in operation S31.

When the USB device is a self-powered USB device 20, the USB host 10 reverses a current path in a power supply line to the self-powered USB device 20 to allow power from the self-powered USB device 20 to be supplied to the USB host 10 in operation S32. When the USB host 10 does not reverse the current path in the power supply line to the self-powered USB device 20, the USB host 10 operates in the normal mode with respect to the self-powered USB device 20 in operation S14.

When the USB host 10 reverses the current path in the power supply line to the self-powered USB device 20 in operation S32, and when the data communication line D+/− between the USB host 10 and the first USB device 20 is turned on in operation S33, the USB host 10 operates in the configured state with respect to the self-powered USB device 20 in operation S34.

When the USB host 10 reverses the current path in the power supply line to the self-powered USB device 20 in operation S32, and when the data communication line D+/− between the USB host 10 and the self-powered USB device 20 is turned off (e.g., deactivated) in operation S33, the USB host 10 operates in the powered state with respect to the self-powered USB device 20 in operation S35.

When the USB host 10 turns on (e.g., activates) the power supply line Vbus connected to the bus-powered USB device 21 in operation S36, the USB host 10 operates in the configured state with respect to the bus-powered USB device 21 in operation S38.

When the power supply line Vbus connected to the bus-powered USB device 21 is turned off (e.g., deactivated) in operation S36, the USB host 10 operates in the attached state with respect to the bus-powered USB device 21 in operation S37.

As described above, according to exemplary embodiments of the inventive concept, a USB host is set to a power saving mode based on the power state of the USB host, and a power supply connection and a data communication connection are separately controlled based on the type of USB device connected to the USB host. As a result, the power consumption of the USB host may be reduced and data communication between the USB host and the USB device may be maintained when the power supply is interrupted.

In addition, according to exemplary embodiments of the inventive concept, the USB host may be set to a power charging mode based on the power state of the USB host, and the power supply connection and the data communication connection may be separately controlled based on the type of USB device connected to the USB host. As a result, the USB host may be supplied with power from the USB device, and the USB host may be provided with longer battery usage time and various charging functions.

While the inventive concept has been particularly shown and described with reference to the exemplary embodiments thereof, it will be understood by those of ordinary skill in the art that various changes in form and detail may be made therein without departing from the spirit and scope of the inventive concept as defined by the following claims.

What is claimed is:

1. A universal serial bus (USB) host, comprising:
   a power unit comprising a battery and a charging module configured to control the battery; and
   a USB interface unit configured to interface with a first USB device,
   wherein the USB interface unit is configured to be controlled based on a remaining amount of power of the battery, and the USB interface unit is configured to maintain a data connection between the USB interface unit and the first USB device when a power supply connection between the USB interface unit and the first USB device is disconnected,
   wherein the data connection between the USB interface unit and the first USB device and the power supply connection between the USB interface unit and the first USB device are established via a same USB cable,
   wherein the USB host is configured to send the first USB device a request of a device type, the device type being information indicating whether the first USB device is a self-powered USB device or a bus-powered USB device,
   wherein the USB host is configured to operate at one of a first power level, a second power level, and a third power level while in a power saving mode,
   wherein the power supply connection to the first USB device is interrupted and the data connection to the first USB device is maintained when the first USB device is the self-powered USB device and the USB host is operating at the first or second power level, and the power supply connection and the data connection to the first USB device are interrupted when the first USB device is the self-powered USB device and the USB host is operating at the third power level, wherein the power supply connection and the data connection to the first USB device are maintained when the first USB device is the bus-powered USB device and the USB host is operating at the first power level, and the power supply connection and the data connection to the first USB device are interrupted when the first USB device is the bus-powered USB device and the USB host is operating at the second or third power level.

2. The USB host of claim 1, wherein the USB interface unit is configured to interface with the first USB device via a data communication line and a power supply line, the data connection between the USB interface unit and the first USB device is established via the data communication line, and the power supply connection between the USB interface unit and the first USB device is established via the power supply line.

3. The USB host of claim 1, further comprising:
an input device configured to receive an input signal, wherein the USB interface unit is configured to be controlled based on the input signal.

4. The USB host of claim 1, wherein the USB interface unit is configured to connect the power supply connection to the first USB device and receive power from the first USB device based on the remaining amount of power of the battery.

5. The USB host of claim 1, wherein the USB interface unit is configured to interface with a second USB device, and the second USB device is bus-powered,
wherein the USB interface unit is configured to connect the data connection to the second USB device while the power supply connection is connected to the second USB device, while the USB host is set to the power saving mode.

6. The USB host of claim 5, wherein the USB host is set to the power saving mode based on the remaining amount of power of the battery.

7. A universal serial bus (USB) host, comprising:
a power unit comprising a battery and a charging module configured to control the battery; and
a USB interface unit configured to interface with at least one USB device,
wherein the USB interface unit is configured to be controlled based on a remaining amount of power of the battery, and the USB interface unit is configured to separately control a power supply line connected to the USB interface unit and the at least one USB device, and a data communication line connected to the USB interface unit and the at least one USB device,
wherein the power supply line and the data communication line are included in a same USB cable,
wherein the USB host is configured to send the at least one USB device a request of a device type, the device type being information indicating whether the at least one USB device is a self-powered USB device or a bus-powered USB device,
wherein the USB host is configured to operate at one of a first power level, a second power level, and a third power level while in a power saving mode,
wherein a power supply connection to the at least one USB device is interrupted and a data connection to the at least one USB device is maintained when the at least one USB device is the self-powered USB device and the USB host is operating at the first or second power level, and the power supply connection and the data connection to the at least one USB device are interrupted when the at least one USB device is the self-powered USB device and the USB host is operating at the third power level, wherein the power supply connection and the data connection to the at least one USB device are maintained when the at least one USB device is the bus-powered USB device and the USB host is operating at the first power level, and the power supply connection and the data connection to the at least one USB device are interrupted when the at least one USB device is the bus-powered USB device and the USB host is operating at the second or third power level.

8. The USB host of claim 7, further comprising:
an input device configured to receive an input signal, wherein the USB interface unit is configured to be controlled based on the input signal.

9. The USB host of claim 7, wherein the USB interface unit is configured to receive power from the self-powered USB device.

10. The USB host of claim 7, wherein the USB interface unit comprises:
a USB port configured to interface with the self-powered and bus-powered USB devices via the power supply line and the data communication line;
a switcher configured to switch between a first connection between the USB port and the data communication line, and a second connection between the USB port and the power supply line; and
a host driver connected to the switcher and the charging module, and configured to identify an interfaced USB device, and determine whether the interfaced USB device is the self-powered USB device or the bus-powered USB device,
wherein the host driver is configured to control the switcher based on the interfaced USB device and the remaining amount of power of the battery.

11. The USB host of claim 10, wherein the switcher is configured to deactivate the power supply line connected to the self-powered USB device, and activate the data communication line connected to the self-powered USB device while the power supply line is deactivated.

12. The USB host of claim 10, wherein the switcher is configured to reverse an input/output path of the power supply line connected to the self-powered USB device,
wherein the battery is charged using power supplied by the self-powered USB device, and the data communication line between the USB host and the self-powered USB device is activated upon reversing the input/output path.

13. The USB host of claim 10, wherein the switcher is configured to reverse an input/output path of the power supply line connected to the self-powered USB device,
wherein the battery is charged using power supplied from the self-powered USB device, and the data communication line between the USB host and the self-powered USB device is deactivated upon reversing the input/output path.

14. The USB host of claim 7, wherein the USB interface unit comprises:
a USB port configured to interface with the self-powered USB device and the bus-powered USB device via the power supply line and the data communication line; and a host driver connected to the charging module, and configured to identify an interfaced USB device, and determine whether the interfaced USB device is the self-powered USB device or the bus-powered USB device, wherein the host driver is configured to switch between a first connection between the USB port and the data communication line, and a second connection between the USB port and the power supply line based on the interfaced USB device and the remaining amount of power of the battery.

15. The USB host of claim 14, wherein the switcher is configured to deactivate the power supply line connected to the self-powered USB device and activate the data communication line connected to the self-powered USB device, and activate the power supply line connected to the bus-powered USB device and activate the data communication line connected to the bus-powered USB device at substantially a same time.

16. The USB host of claim 14, wherein the switcher is configured to deactivate the power supply line connected to the self-powered USB device and activate the data communication line connected to the self-powered USB device, and deactivate the power supply line connected to the bus-powered USB device and deactivate the data communication line connected to the bus-powered USB device at substantially a same time.

17. The USB host of claim 14, wherein the host driver is configured to reverse an input/output path of the power supply line connected to the self-powered USB device,
wherein the battery is charged using power supplied from the self-powered USB device, the data communication line connected to the self-powered USB device is activated, the power supply line connected to the bus-powered USB device is activated, and the data communication line connected to the bus-powered USB device is activated at substantially a same time.

18. The USB host of claim 14, wherein the host driver is configured to reverse an input/output path of the power supply line connected to the self-powered USB device,
wherein the battery is charged using power supplied from the self-powered USB device, the data communication line connected to the self-powered USB device is activated, the power supply line connected to the bus-powered USB device is deactivated, and the data communication line connected to the bus-powered USB device is deactivated at substantially a same time.

19. A universal serial bus (USB) power management method, comprising:
connecting a USB device to a USB host, wherein the USB host comprises a battery;
determining a remaining amount of power of the battery;
setting an operation mode of the USB host to a normal mode upon determining that the remaining amount of power is greater than a first power threshold;
setting the operation mode of the USB host to a power saving mode upon determining that the remaining amount of power is less than or equal to the first power threshold and greater than a second power threshold; and
setting the operation mode of the USB host to a power charging mode upon determining that the remaining amount of power is less than the second power threshold,
wherein the USB host communicates data with the USB device and supplies power to the USB device while in the normal mode, and the USB host communicates data with the USB device and receives power from the USB device while in the power charging mode,
wherein the USB host operates at one of a first power level, a second power level, and a third power level while in the power saving mode,
wherein a power supply connection to the USB device is interrupted and a data connection to the USB device is maintained when the USB device is a self-powered USB device and the USB host is operating at the first or second power level, and the power supply connection and the data connection to the USB device are interrupted when the USB device is the self-powered USB device and the USB host is operating at the third power level,
wherein the power supply connection and the data connection to the USB device are maintained when the USB device is a bus-powered USB device and the USB host is operating at the first power level, and the power supply connection and the data connection to the USB device are interrupted when the USB device is the bus-powered USB device and the USB host is operating at the second or third power level.

20. The USB management method of claim 19, further comprising:
reversing an input/output path of the power supply line between the USB host and the USB device while in the power charging mode,
wherein the USB device is self-powered, the battery is charged using power supplied from the USB device, and the data communication line between the USB host and the USB device is deactivated upon reversing the input/output path.

* * * * *